United States Patent [19]

Kage

[11] Patent Number: 5,463,672
[45] Date of Patent: Oct. 31, 1995

[54] PERSONAL MOBILE COMMUNICATIONS SYSTEM HAVING CENTRAL STATION FOR PAGING MOBILE USERS VIA BASE STATIONS

[75] Inventor: Kouzou Kage, Tokyo, Japan

[73] Assignee: NEC Corporation, Tokyo, Japan

[21] Appl. No.: 989,695

[22] Filed: Dec. 14, 1992

[30] Foreign Application Priority Data

| Dec. 12, 1991 | [JP] | Japan | 3-329097 |
| Dec. 12, 1991 | [JP] | Japan | 3-329098 |
| Dec. 25, 1991 | [JP] | Japan | 3-343602 |
| Dec. 25, 1991 | [JP] | Japan | 3-343603 |
| Dec. 25, 1991 | [JP] | Japan | 3-343604 |
| Dec. 25, 1991 | [JP] | Japan | 3-343605 |
| Jan. 20, 1992 | [JP] | Japan | 4-007636 |

[51] Int. Cl.⁶ ................................................. H04Q 7/22
[52] U.S. Cl. ................................ 379/59; 379/57; 379/58; 379/60; 455/33.1
[58] Field of Search .................................. 379/56, 57, 58, 379/59, 60, 62; 455/33.2, 33.1, 56.1

[56] References Cited

U.S. PATENT DOCUMENTS

| 4,661,972 | 4/1987 | Kai | 379/57 |
| 5,095,531 | 3/1992 | Ito | 455/33.1 |
| 5,153,903 | 10/1992 | Eastmund et al. | 379/57 |
| 5,175,758 | 12/1992 | Levanto et al. | 379/57 |
| 5,210,787 | 5/1993 | Hayes et al. | 379/60 |
| 5,311,571 | 5/1994 | Pickert | 379/58 |
| 5,327,144 | 7/1994 | Stilp et al. | 379/58 |
| 5,329,574 | 7/1994 | Nielson et al. | 379/58 |

FOREIGN PATENT DOCUMENTS

| 0137865 | 4/1985 | European Pat. Off. . |
| 0167458 | 1/1986 | European Pat. Off. . |
| 0324508 | 7/1989 | European Pat. Off. . |
| 0374787 | 6/1990 | European Pat. Off. . |
| 0456547 | 11/1991 | European Pat. Off. . |
| 0479477 | 4/1992 | European Pat. Off. . |
| 2625475 | 4/1978 | Germany . |
| 3706240 | 9/1988 | Germany . |
| 2234649 | 2/1991 | United Kingdom | 379/59 |
| 2260879 | 4/1993 | United Kingdom | 379/60 |
| 9113509 | 9/1991 | WIPO . |
| 9203006 | 2/1992 | WIPO . |
| 3001665 | 1/1993 | WIPO | 379/58 |

OTHER PUBLICATIONS

Kawano, Iwahashi, Mitsui, Ozu, "Design Features of a Premises Cordless Telephone System", IEEE, May 1990.
Proceedings of the National Communications Forum, vol. 42, No. 2, 30 Sep. 1988, pp. 1706–1713, Jackson, "Portable Communication".

*Primary Examiner*—Curtis Kuntz
*Assistant Examiner*—William D. Cumming
*Attorney, Agent, or Firm*—Sughrue, Mion, Zinn, Macpeak & Seas

[57] ABSTRACT

A personal mobile communications system comprises base stations (4-1–4-4) located in respective zones and a paging station (8) covering an area including the zones, or cells (5-1–5-4). The paging station and all base stations are connected to a public switched telephone network (PSTN). When a call is originated from a PSTN user (2) to a mobile user (10), the paging station receives a call-setup request from the PSTN containing the address codes of both PSTN and mobile users, and broadcasts the call-setup signal over the covered cells. One or more base stations (4-1–4-3) receive the call-setup signal and, in response, broadcast an alert signal. One of the base stations (4-2) receives an off-hook signal from the alerted mobile station (10) and dials the PSTN user address code contained in the call-setup signal to the PSTN to establish a connection (15; 147–149; 176–178) between the calling and called parties (2,10).

4 Claims, 12 Drawing Sheets

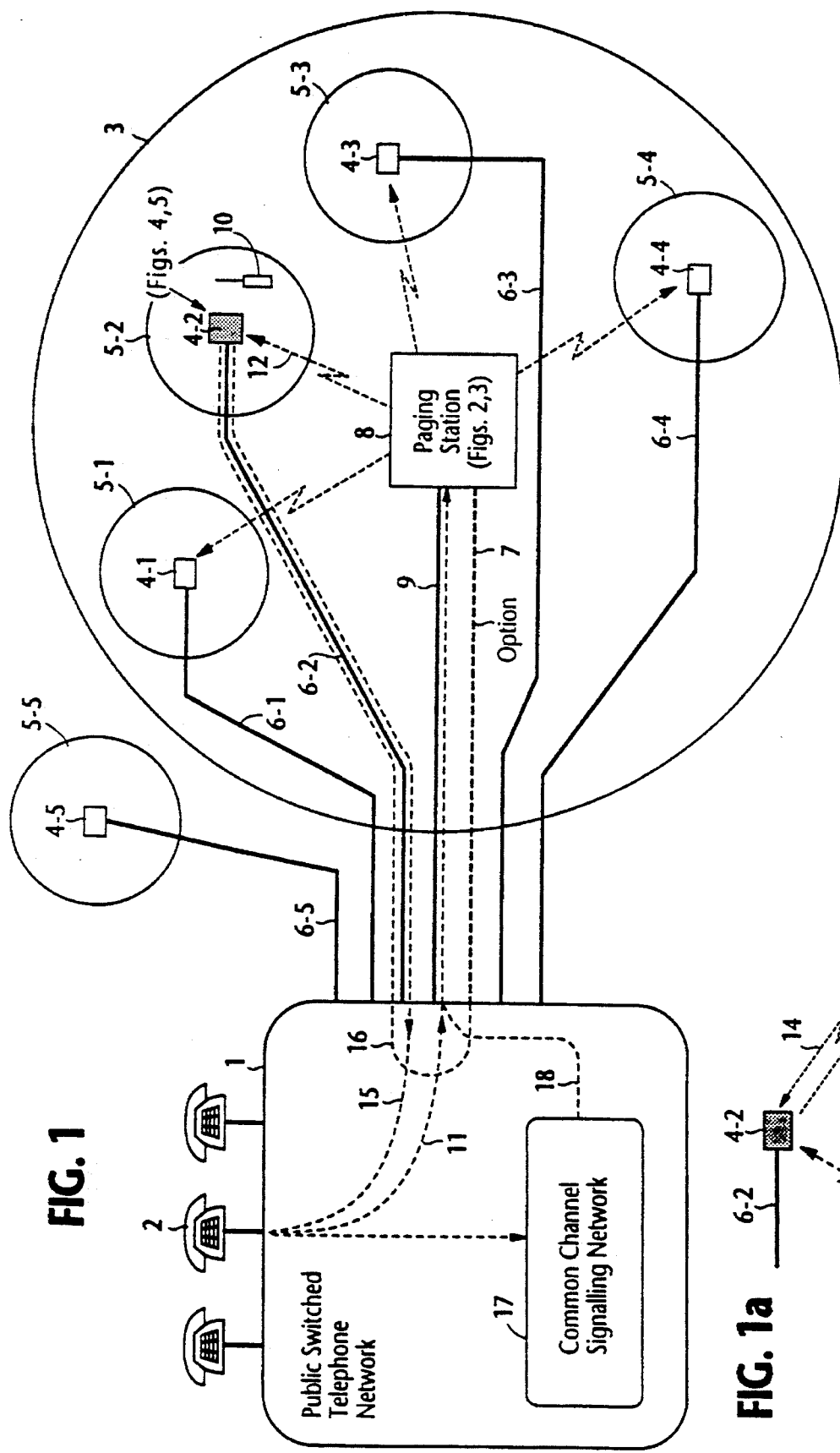

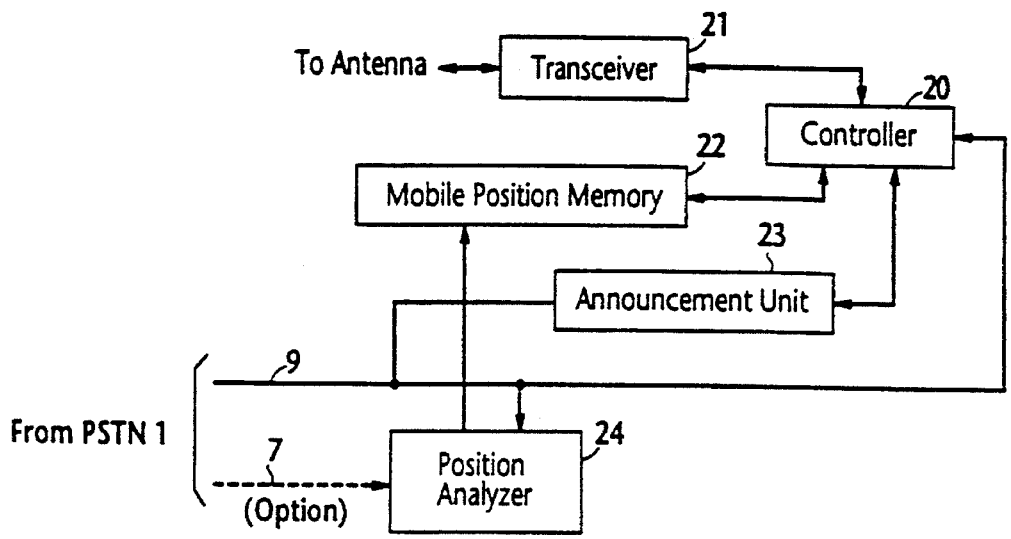
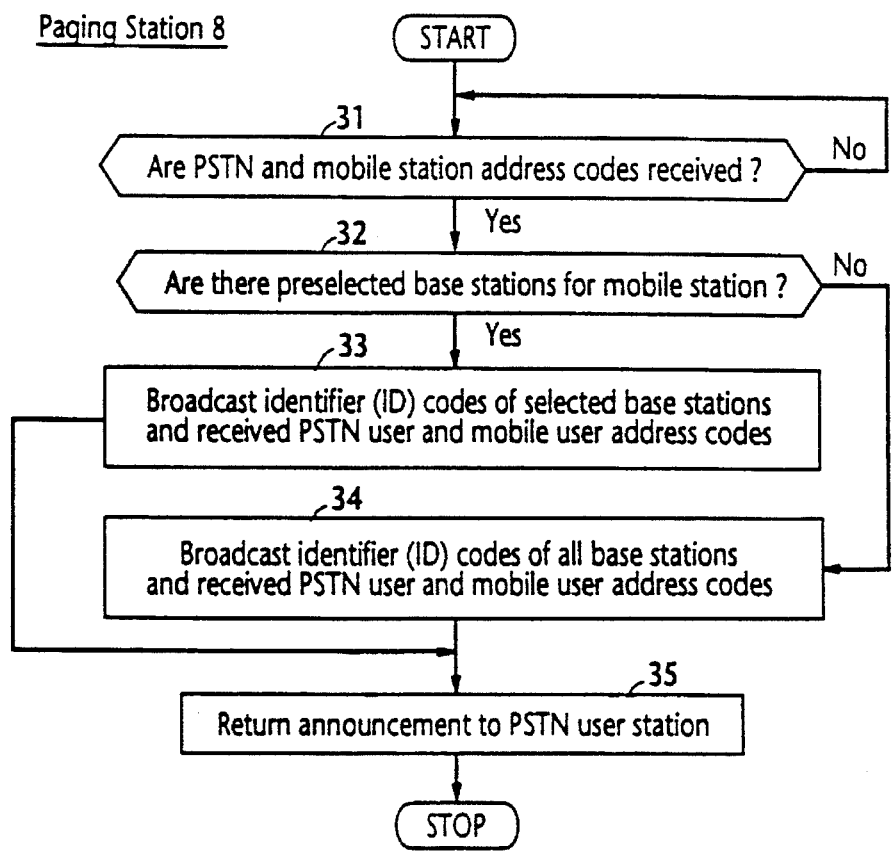

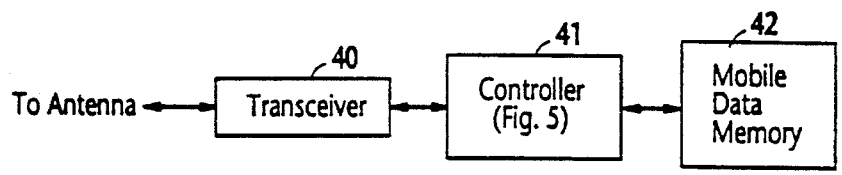
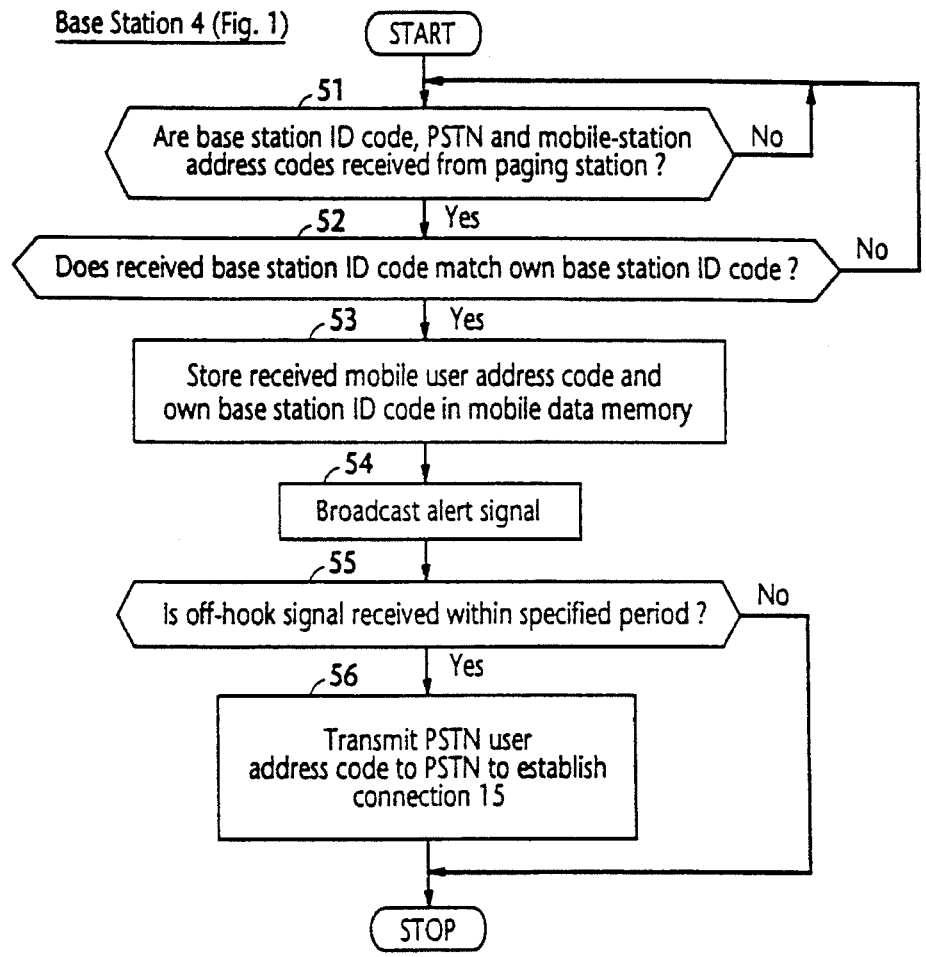
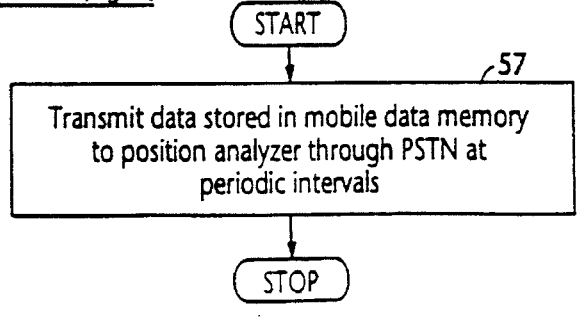

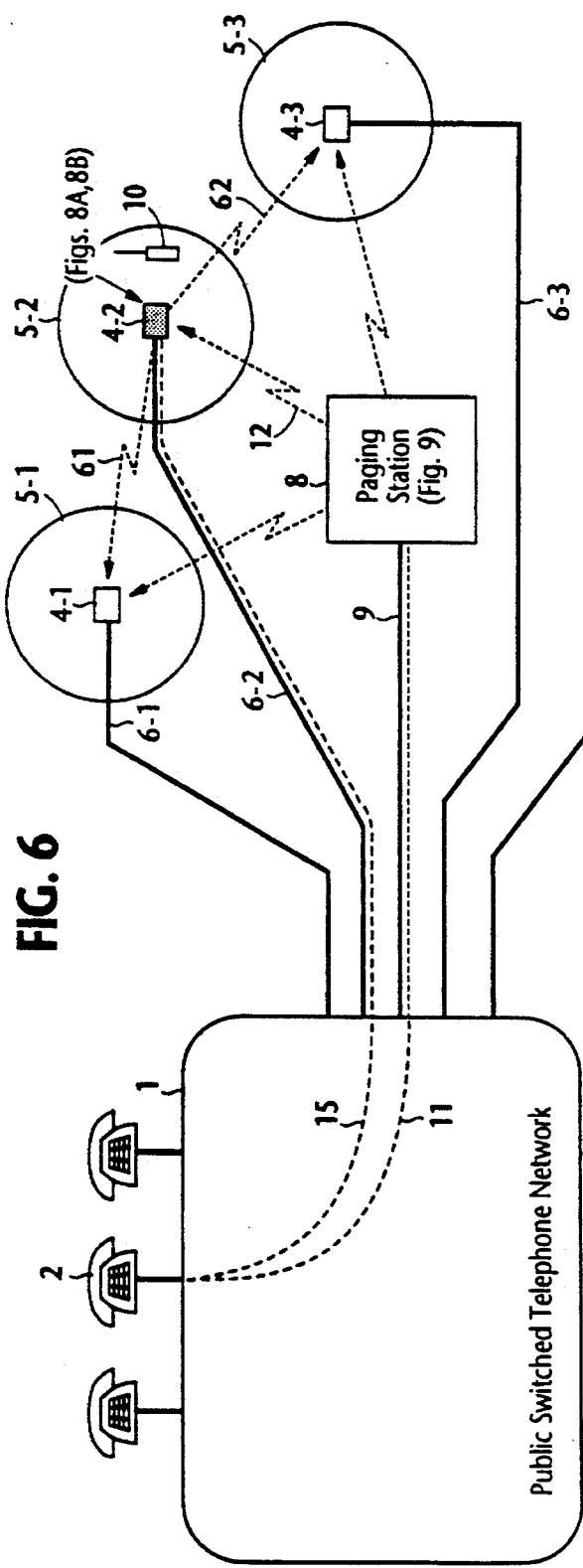

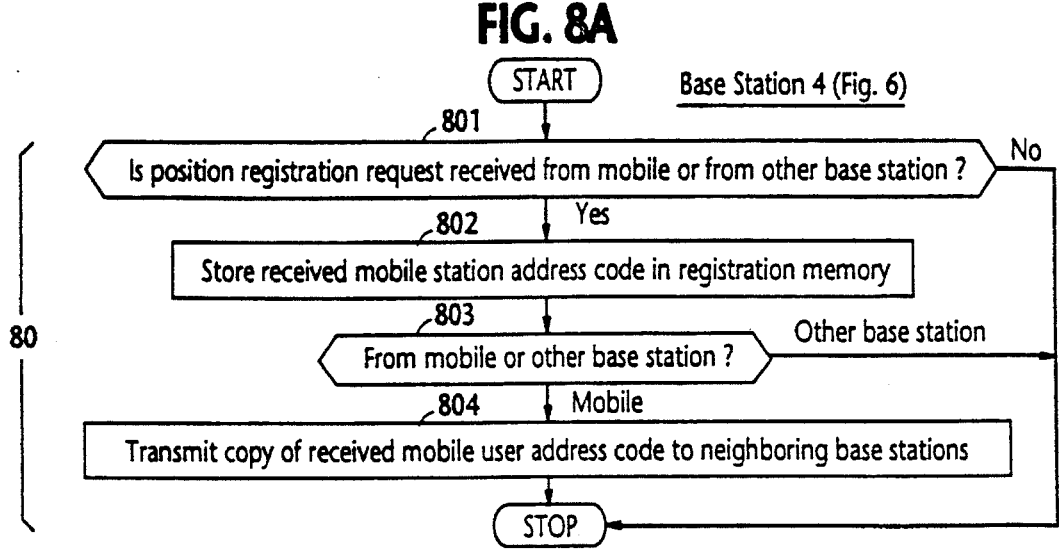
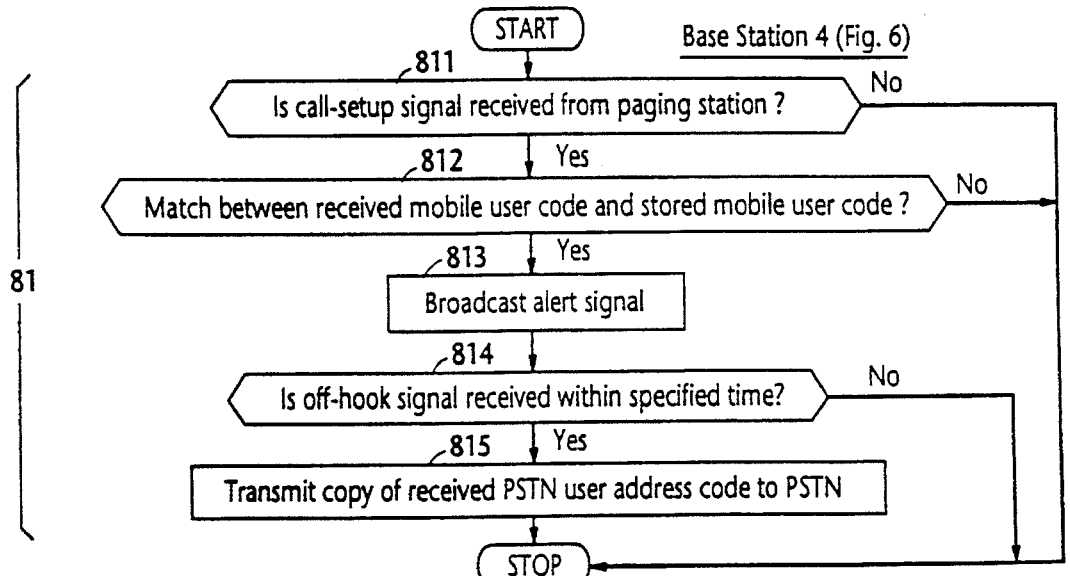
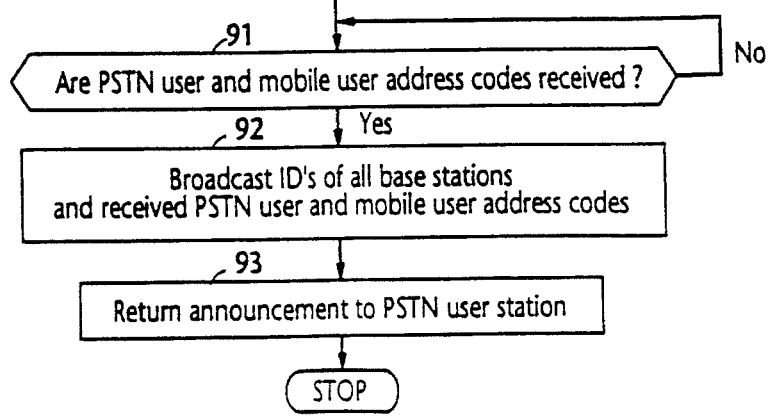

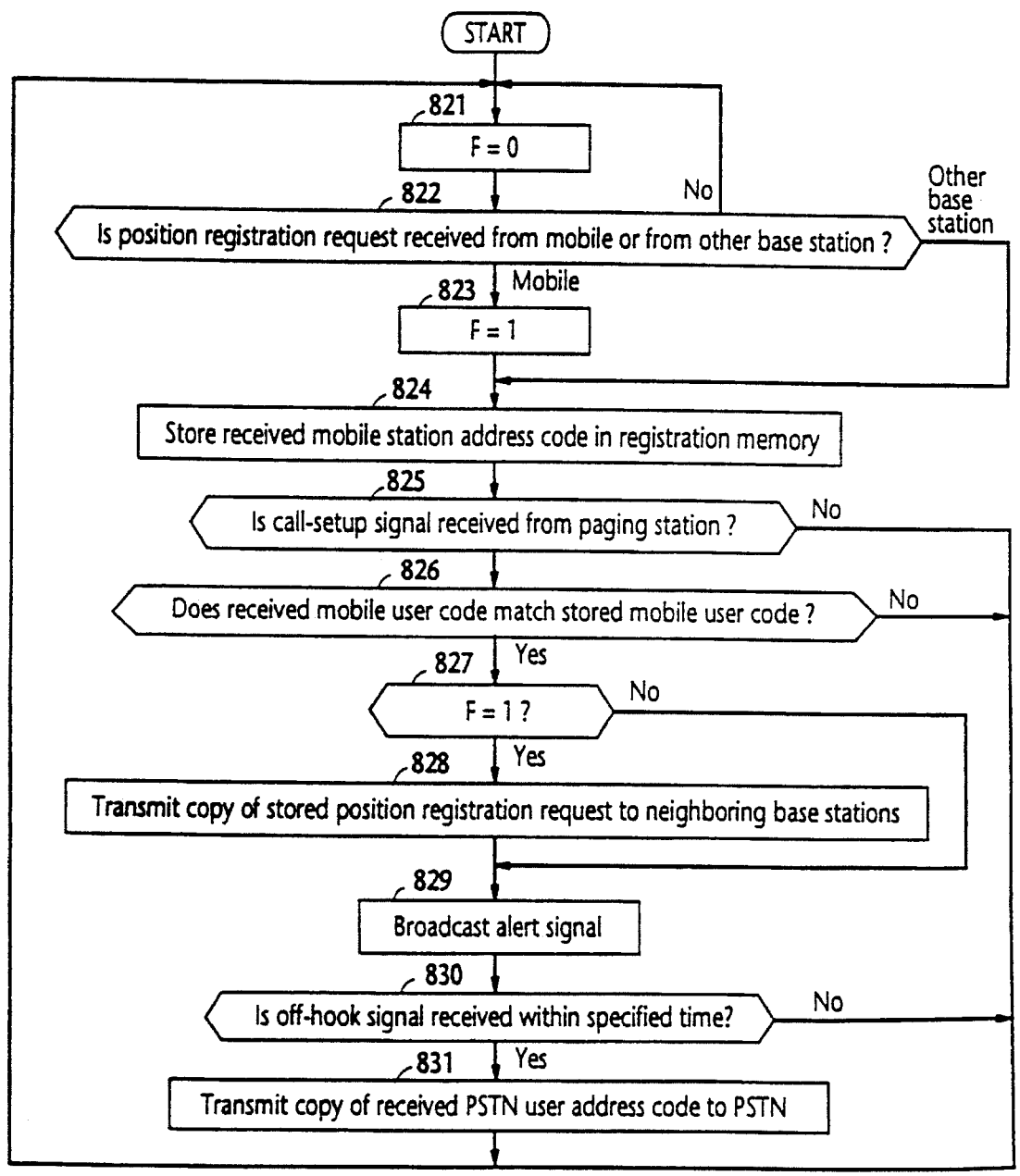

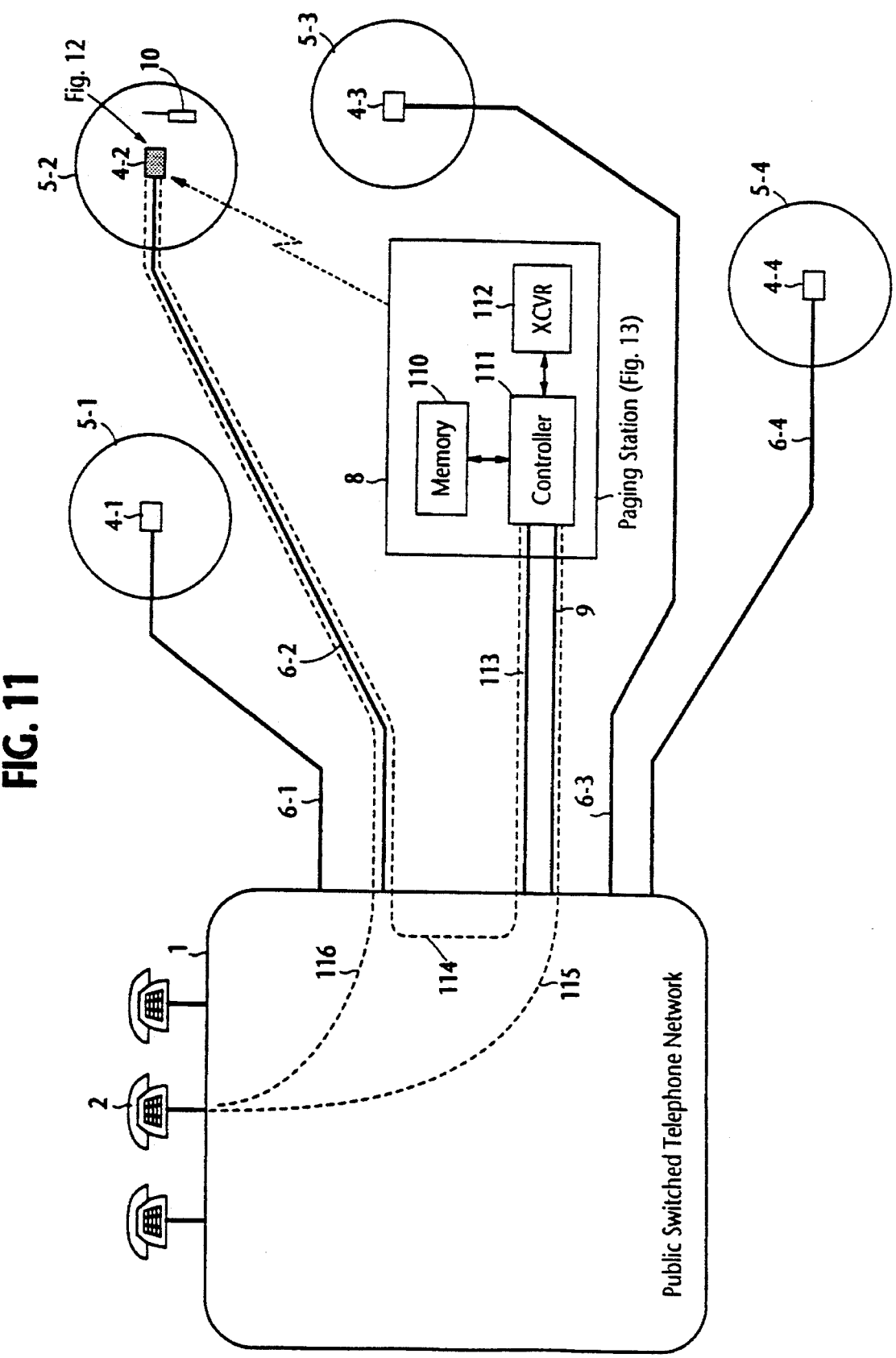

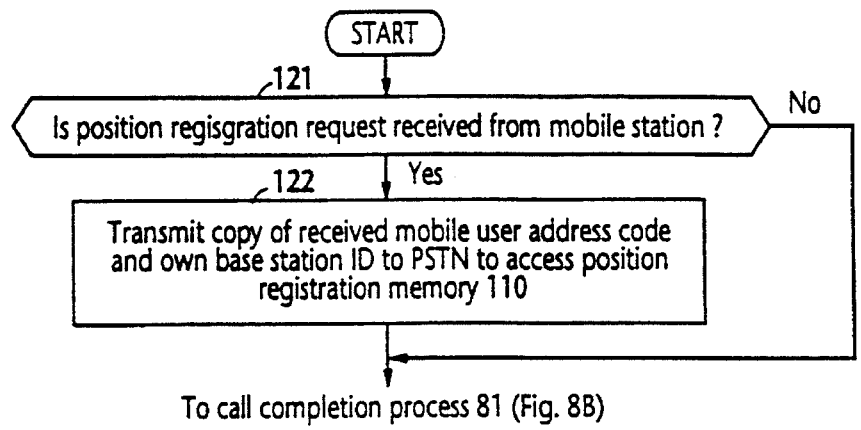
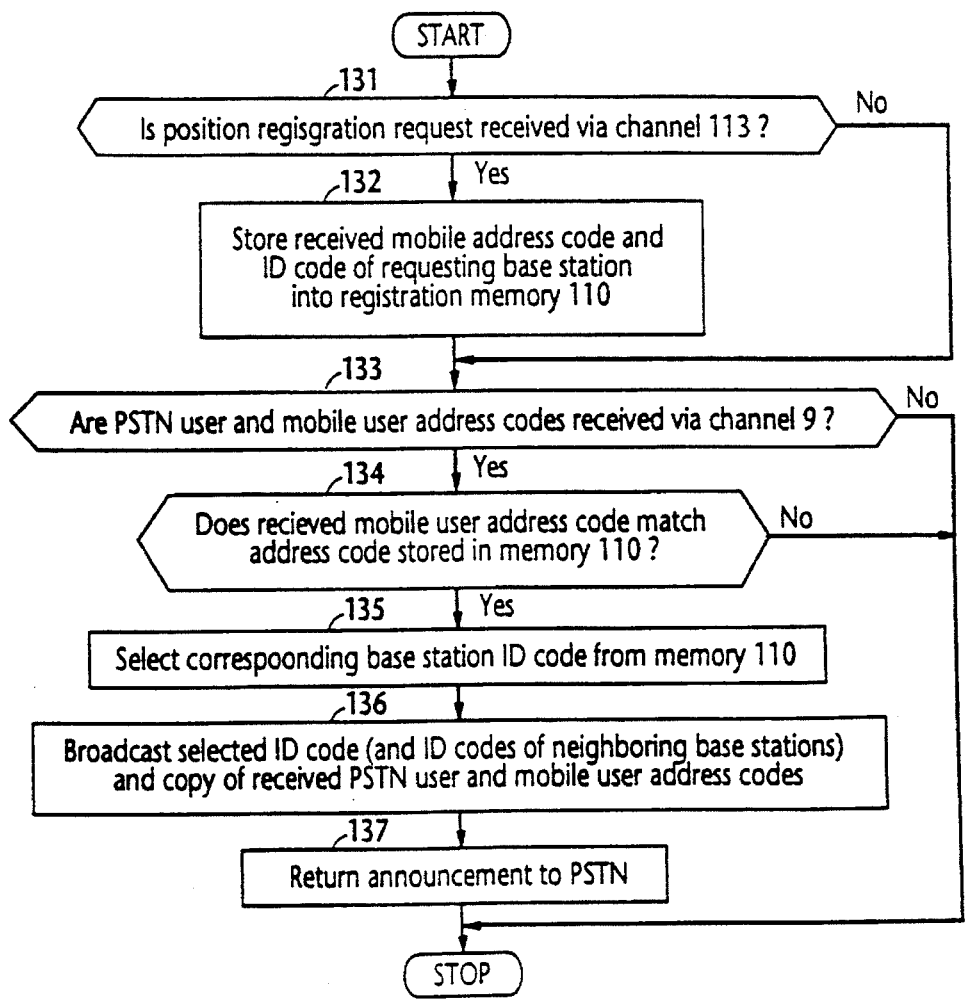

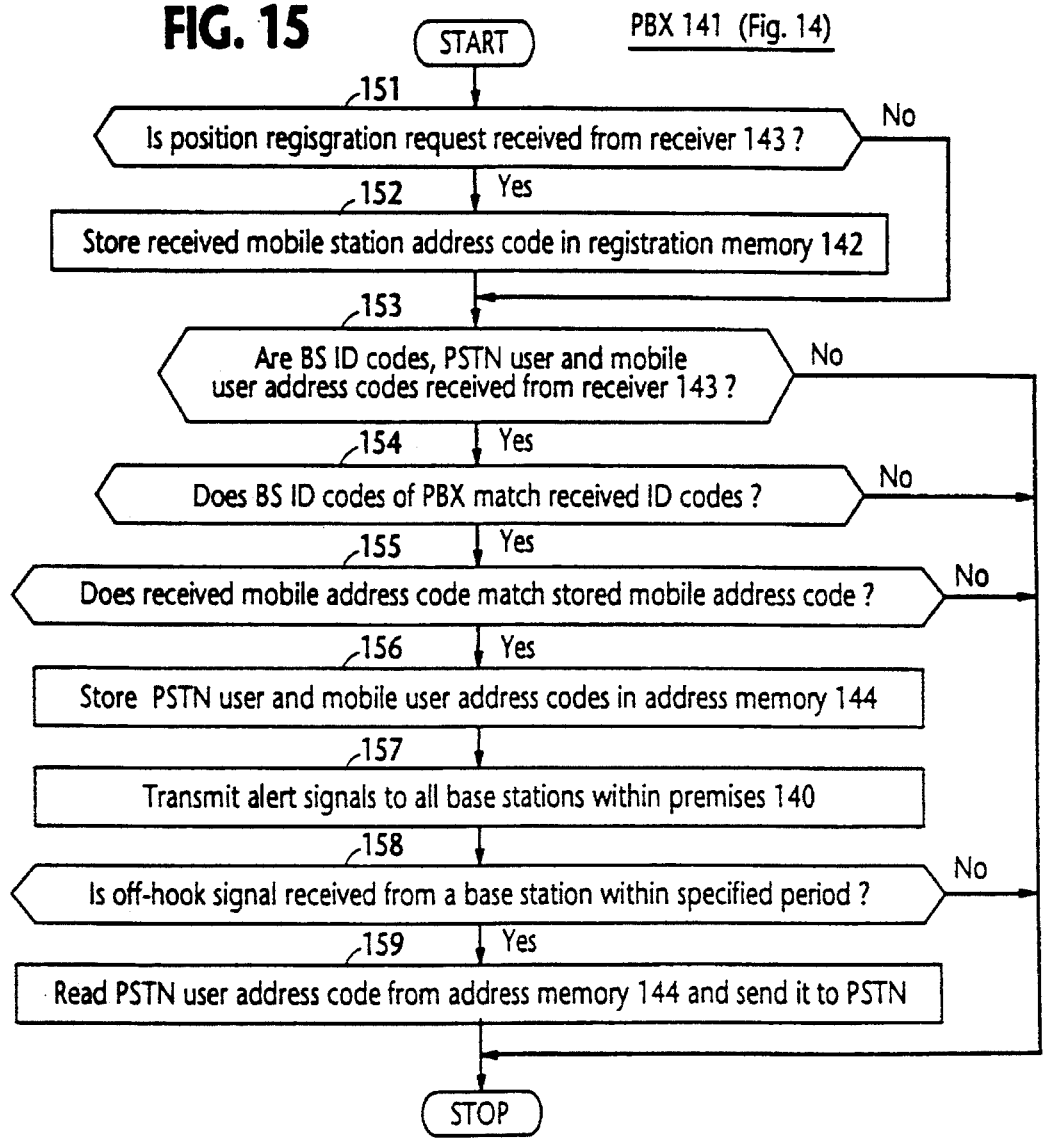
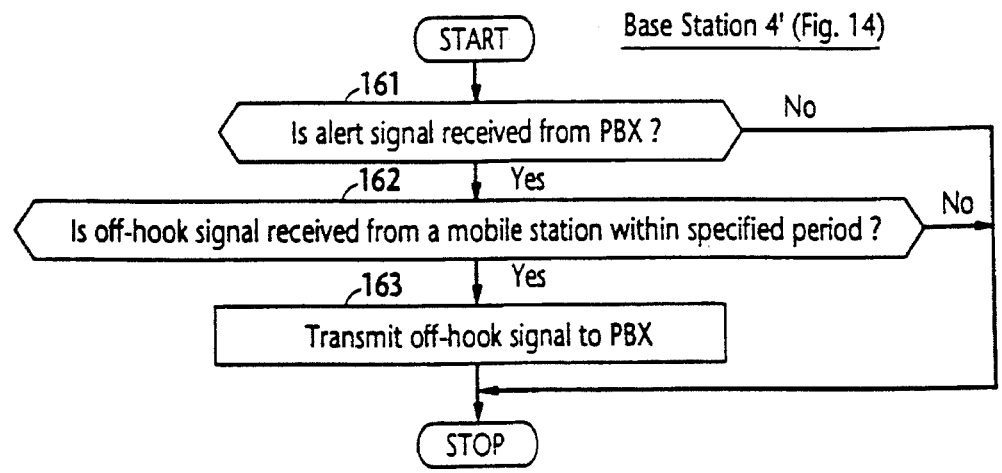

FIG. 17

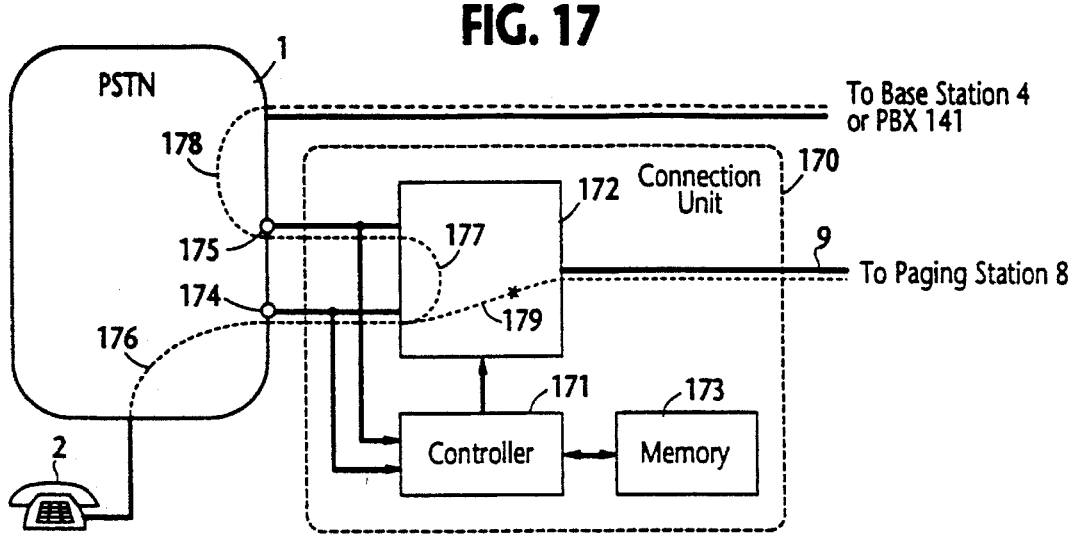

FIG. 17a

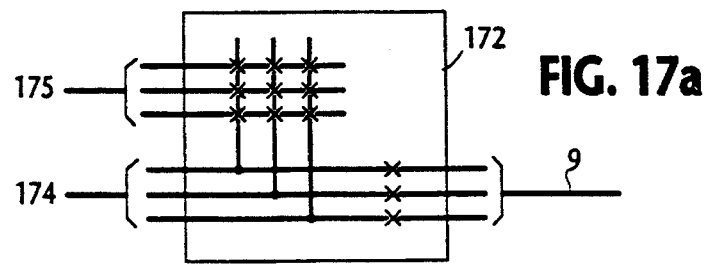

FIG. 18

Connection Unit 170

START
↓
181 — PSTN user and mobile user address codes received from terminal 174? — No
↓ Yes
182 — PSTN user and mobile user address codes received from terminal 175? — No
↓ Yes
183 — Match between codes from base station (PBX) and stored codes? — Yes →
↓ No
184 — Establish connection 177 and clear down connection 179
↓
STOP

FIG. 19

Base Station 4 or PBX 141

From step 815 (Fig. 8B)
↓
190 — Transmit PSTN user and mobile user address codes to PSTN to access connection unit 170 to establish connections 177, 178
↓
STOP

PERSONAL MOBILE COMMUNICATIONS SYSTEM HAVING CENTRAL STATION FOR PAGING MOBILE USERS VIA BASE STATIONS

BACKGROUND OF THE INVENTION

1. Field of the Invention

The present invention relates generally to mobile communications systems, and more specifically to a personal mobile telephone system distinct from automobile telephone systems.

2. Description of the Related Art

Mobile telephone systems which have been proposed for servicing personal (handset) mobile stations are of two types. One is the type of system which is similar to the conventional cellular automobile telephone system where the location of each automobile is identified at all times by the system, and the other is a simplified, low-cost system which involves the use of a paging station as a means for directly paging a mobile station in the same manner as it pages the usual radio paging users. In the former case, the system would require some procedure for making a registration of a personal mobile station. A database for storing the positions of individual mobile stations and a dedicated switching system would be needed for this purpose. A call to a mobile station from the public switched telephone network would need an access to the database to determine in which zone (cell) the mobile station is currently located and then establish a connection through the dedicated switching system to the destination. This represents a significant burden on land lines, system complexity and a substantial amount of investment. In the latter case, the personal mobile unit would be designed so as to integrate its telephone functions with the functions of a radio pager. On receiving a page from a network user, the mobile user would know the telephone number of the calling party and call back the network user by dialling the paged number. However, a number of disadvantages are apparent; the mobile user needs to call back the network user, and the necessity to combine the telephone and paging functions results in an unnecessary cost and a bulky design.

SUMMARY OF THE INVENTION

It is therefore an object of the present invention to provide a personal mobile telephone system that is low cost and automatically establishes a full-duplex connection.

According to a broader aspect of the present invention, the personal mobile communications system serves a plurality of radio zones, or cells, and comprises a plurality of base stations located in respective cells. Each base station is connected to a public switched telephone network (PSTN). A central station is connected to the PSTN for receiving a call-setup request from the PSTN containing a PSTN user address code and a mobile user address code when a PSTN user places a call to a mobile user and broadcasting the received PSTN user and mobile user address codes over an area covering the plurality of cells. One or more base stations receive the PSTN user and mobile user address codes from the central station and, in response, broadcast an alert signal for alerting mobile stations. One of the base stations dials the received PSTN user address code to the PSTN when a mobile station identified by the received mobile user address code goes off hook, so that a connection is established in the PSTN between the PSTN user and the mobile user.

According to a first specific aspect of this invention, each base station receives and stores a position registration request from the mobile station, the position registration request including the mobile user's address code. The alert signal is broadcast from the base station when a match is detected between the mobile user address code received from the central station and the stored mobile user address code.

According to a second aspect, the central station comprises a position registration memory. It receives and stores a position registration request sent from a base station into the memory, selects one of the base stations identified by a base station identifier stored in the memory in response to a call-setup signal from the PSTN, and broadcasts the base station identifier as well as a copy of the PSTN user and mobile user address codes contained in the call-setup signal.

According to a third aspect, the personal mobile communications system comprises a local switching system located in a premises and connected to the PSTN, a plurality of base stations located in respective cells, each base station is located in the same premises and connected to the local switching system. A central station is connected to the PSTN for receiving a call-setup request from the PSTN containing a PSTN user address code and a mobile user address code when a PSTN user places a call to a mobile user and broadcasting the received PSTN user and mobile user address codes over an area covering the premises and at least one cell. A receiver is provided for receiving the call-setup signal from the central station and transmitting that signal to the local switching system. The local switching system receives the call-setup signal from the receiver and, in response, transmits an alert signal to the base stations and dials the PSTN user address code contained in the received call-setup signal to the PSTN when a mobile station identified by the mobile user address code contained in the call-setup signal goes off hook so that a connection is established in the PSTN between the PSTN user and the mobile user.

BRIEF DESCRIPTION OF THE DRAWINGS

The present invention will be described in further detail with reference to the accompanying drawings, in which:

FIG. 1 is a schematic block diagram of a first embodiment of the present invention, and FIG. 1a is an illustration showing details of zone 5-2 of FIG. 1;

FIG. 2 is a block diagram of the paging station of FIG. 1;

FIG. 3 is a flowchart of operations executed by the controller of the paging station of FIG. 1;

FIG. 4 is a block diagram of the base station of FIG. 1;

FIGS. 5 and 5a are flowcharts of operations executed by the controller of each base station of FIG. 1 located within the service area of the paging station;

FIG. 6 is a schematic block diagram of a second embodiment of this invention;

FIG. 7 is a block diagram of each base station of FIG. 6;

FIGS. 8A and 8B are flowcharts of operations executed by each base station of FIG. 6 located within the service area of the paging station, and FIG. 8C is a flowchart according to a modification of the processes of FIGS. 8A and 8B;

FIG. 9 is a flowchart of operations performed by the paging station of FIG. 6;

FIG. 10 is a sequence diagram useful for describing the operation of FIG. 6;

FIG. 11 is a schematic block diagram of a third embodiment of this invention;

FIG. 12 is a block diagram of each base station of FIG. 6;

FIG. 13 is a flowchart of operations executed by the paging station of FIG. 11;

FIG. 15 is a flowchart of operations performed by the PBX of FIG. 14;

FIG. 16 is a flowchart of operations performed by each base station of FIG. 14 located in the premises of the PBX;

FIG. 17 is a block diagram of a modification of the present invention, and FIG. 17a shows details of the switching circuit of FIG. 17;

FIG. 18 is a flowchart of operations performed by the connection unit of FIG. 17;

FIG. 19 is a flowchart of operations performed by the base stations or PBX of FIG. 14;

DETAILED DESCRIPTION

Figure 14:
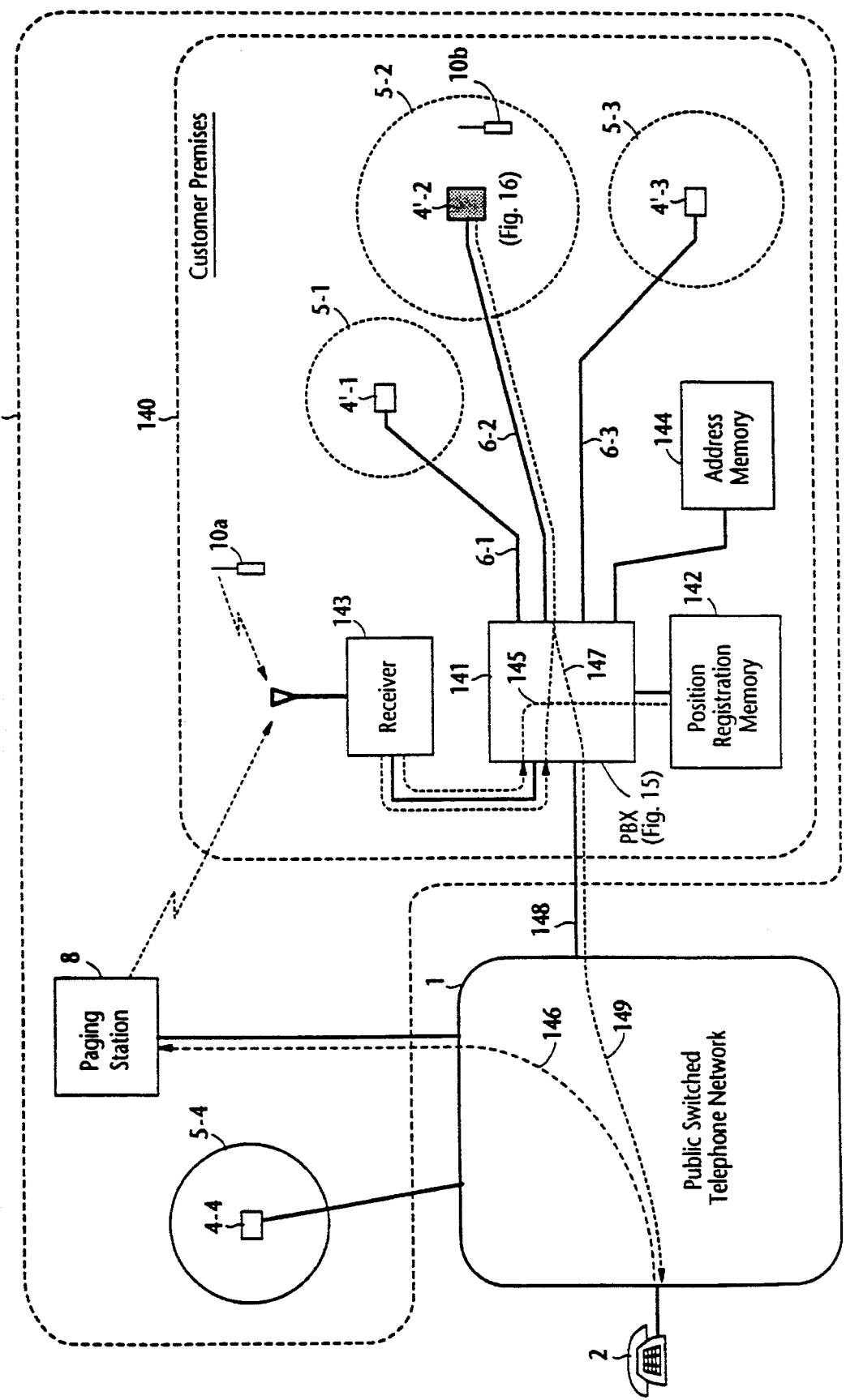
FIG. 14 is a schematic block diagram of a fourth embodiment of this invention.

Referring now to the drawings, like numerals refer to like parts throughout the drawings. In FIG. 1, there is shown a personal mobile telephone system incorporating a first embodiment of the present invention which establishes a connection from an ordinary telephone served by the public switched telephone network (PSTN) 1 and a personal mobile telephone in response to a call originated by the PSTN telephone. The system includes a plurality of base stations 4-1~4-5 located respectively at cell sites to define cells, or radio zones, 5-1~5-5, and individually connected by land lines, or communication channels 6-1~6-5 to the PSTN 1 to which ordinary telephones 2 are terminated. A paging station 8 is provided to define a paging service area 3 covering cellular zones 5-1~5-4, for example. Each of the cellular telephone service zones 5-1-5-5 has a radius of from 100 to several hundreds of meters, while the paging service area 3 has a radius of from several kilometers to several tens of kilometers. Paging station 8 is connected by a transmission line 9 to the PSTN to broadcast a copy of a call-setup signal received from the PSTN in accordance with the present invention, as well as the usual paging signals. The call-setup signal is received by the base stations located within the area 3 to process the incoming telephone calls. Each base station within the area 3 is identified with a unique base station identifier (ID) code.

As illustrated in FIG. 2, the paging station 8 is provided with a controller 20, a radio transceiver 21, a mobile position memory 22, an announcement unit 23 to generate prerecorded announcement, and a position analyzer 24 which is connected to the PSTN by line 9 or by an option line 7. Controller 20 is programmed to perform operations described in a sequence of instructions as shown in FIG. 3. According to the present invention, when a call is originated from a PSTN user to a mobile (personal handset) user, a source address code (the PSTN caller's telephone number) and a destination address code (the called mobile telephone number) are transmitted from the PSTN to the paging station 8 through line 9. The program execution starts with reception of a call-setup signal from the PSTN (step 31). When controller 20 receives a PSTN user address code and a mobile user address code from the PSTN, it proceeds to step 32 to access the mobile position memory 22 and searches for one or more base stations which have been preselected as a likely destination of the called mobile station. If the answer is negative, control branches out to step 34 to broadcast a call-setup signal containing the identifier codes of all base stations (BS) located within the paging area 3 and a copy of the received address codes of both PSTN and mobile users.

Since the paging station 8 is only capable of transmitting paging signals in a one-way channel, a full-duplex (two-way) channel must be established. For this purpose, control proceeds to step 35 to return a voice announcement recorded in the announcement unit 23, urging the caller to replace the handset to allow the system to reestablish the connection through a new route. If the decision at step 32 is affirmative, control branches to step 33 to broadcast a call-setup signal containing the ID codes of the preselected base stations as well as a copy of the received address codes of both PSTN and mobile users, with control advancing to step 35 following broadcasting of the call-setup signal.

Therefore, if the PSTN user 2 places a call to a mobile station 10 located within zone 5-2, a connection 11 is established within PSTN 1 and through line 9 to paging station 8, and a connection 12 is established on a radio channel between paging station 8 and base station 4-2.

The charging of tariff on the calling PSTN user begins when a connection 15 is established in a manner as will be described. For that purpose, some provision may be made of the PSTN to recognize that, when a connection is attempted from any of the lines 6-1~6-4 to a calling PSTN user, the connection is to be treated as if it were originated from the PSTN user.

If the public switched telephone network comprises a known common channel signalling network 17, such as CCITT signalling system No. 7, as shown in FIG. 1, the paging station 8 is able to receive the call-setup signal through a signalling path 18 without establishing the connection (speech path) 11. In this case, the speech path connection 15 is established without having the PSTN user go on hook, and no announcement unit 23 needs to be installed in the paging station 8.

As shown in FIG. 4, each base station 4 is provided with a controller 41 associated with transceiver 40 and a mobile data memory 42. Controller 41 is programmed as shown in FIG. 5 to execute decision step 51 by checking to see if a call-setup signal is received from the paging station containing base station ID codes, and user address codes of both PSTN and mobile stations. If the answer is affirmative, the ID code of the base station is checked to see if it matches a received base station ID code (step 52). If this is the case, the received mobile user's address code is stored into the mobile data memory 42 (step 53). Control now proceeds to step 54 to broadcast an alert signal containing a copy of the address code of the mobile station received from the paging station. Thus, the user of mobile station 10 is alerted and goes off hook to establish a downstream connection 13 (FIG. 1a) by sending an off-hook signal to the base station 4-2 via an upstream connection 14. At the base station, control is performing step 55 to check to see if an off-hook signal is received within a specified period. If the answer is affirmative, control proceeds to step 56 to dial the received PSTN user address code through line 6 to establish the connection 15 in the PSTN.

In FIG. 5a, each base station 4-i executes step 57 by dialing the access code of line 7 or 9 via a line 6-1 to establish a connection 16 in the PSTN and transmitting mobile station's address codes stored in memory 42 accompanied by the ID code of the base station at periodic intervals to the position analyzer 24, at central station 8, where the data from all base stations are analyzed to preselect those base stations with which each mobile station has a high interest of community and the ID codes of the selected base stations are stored into the mobile position memory 22. This preselection procedure minimizes the useless broadcasting of energy from base stations not associated with the mobile station of interest. Permanent and/or temporary home-position mobile users may be registered in such mobile position memory to be used to classify base stations as having a high interest of community.

Registration of the position of a mobile station can also be achieved in an effective manner in different embodiments which will be described below. Mobile stations are preferably implemented with digital circuitry and the system operates using a time-division multiple access technique. Each base station is constantly broadcasting available speech channel identifiers and the base station identifier on a control channel, and each mobile station is constantly monitoring the control channel to be aware of the zone in which it is currently located and the channels to use.

One embodiment of the mobile position registration is shown in FIG. 6 in which the call-setup signal broadcast from the paging station does not contain base station ID codes so that it is received by all base stations 5-1–5-4. As shown in FIG. 7, each base station 4 includes a position registration memory 72 to provide a check between a mobile user address code contained in the call-setup signal received from the paging station and one that is stored in the memory 72 in response to a position registration request issued from the mobile station. This memory is connected to a controller 71 which cooperates with transceiver 70 to establish a channel with paging station 8 as well as mobile stations. According to this embodiment, the user of a mobile station, on entering a new cellular zone, registers his position by sending its address code. The mobile station is implemented with circuitry that automatically transmits a position registration request containing the address code of the mobile station on entering a new cell, or provided with a manual switch that triggers the circuitry to transmit such a request.

In FIG. 8A, controller 71 of each base station 4 performs programmed operations which begin with a position registration process 80. The process 80 includes decision step 801 which determines if there is a position registration request received either from a mobile station or a neighboring base station. If there is one, control branches to step 802 to store the mobile user's address code contained in the received registration request into the position registration memory 72. Exit then is to decision step 803 to check to see if the request is originated from a mobile or a base station. If the received code is determined to be originated from a mobile station, control branches to step 804 to transmit a copy of the received mobile user address code to neighboring base stations via paths indicated at 61 and 62 in FIG. 6, and proceeds to enter a call termination process 81 (FIG. 8B). Otherwise, it skips step 804 and enters the call termination process 81, which is also executed when the decision at step 801 is negative.

Prior to description of the call termination process 81, it is appropriate to refer to FIG. 9 to describe operations performed by the paging station of FIG. 6. When the paging station receives PSTN user and mobile user address codes from the PSTN 1 (step 91), it broadcasts a call-setup signal containing a copy of the received PSTN and mobile user's address codes (step 92), and then returns a voiced announcement (step 93) from the announcement unit 23 to urge the PSTN calling station to go on hook in the same manner as described.

Referring to FIG. 8B, call termination process 81 begins with decision step 811 which checks to see if a call-setup signal is received from paging station 8. If the decision is affirmative at step 811, control branches at step 811 to step 812 to check to see if the received mobile user address code matches one of the address codes registered in the position registration memory 72. An alert signal is then broadcast from the base station (step 813) and the reception of an off-hook signal is checked (step 814). When the destination mobile station answers an incoming call, a copy of the PSTN user address code received from the paging station is transmitted from the base station 4-i of that mobile station to the PSTN through channel 6-i (step 815).

The operation of the embodiment of FIG. 6 proceeds in a manner as shown in FIG. 10. When mobile station 10 issues a position registration request from within zone 5-2, the request is accepted by base station 4-2, which, in response, transmits a copy of the request to neighboring base stations 4-1 and 4-3 where the received copy is stored in the respective memory. When PSTN user station 2 originates a call to mobile station 10 and connection 11 is established, the paging station 8 broadcasts a call-setup signal containing the ID codes of all base stations and a copy of the received PSTN and mobile users' address codes (see also step 92, FIG. 9), while urging the calling party to clear the connection 11. The call-setup signal is received by all base stations. Since the address code of the mobile station 10 is stored only in base stations 4-1–4-3, these stations respond to the call-setup signal by broadcasting alert signals as indicated in FIG. 10. Mobile station 10 answers this call by sending an off-hook signal, which is received by base station 4-2 which then dials the PSTN user address code to establish connection 15.

FIG. 8C shows a modified version of the position registration and call termination processes. According to this modification, the position registration request from a mobile station is stored in a base station that transmits a copy of this request at the time it receives a call-setup signal from the paging station, rather than at the time it receives the request from the mobile station. The program execution starts with initialization step 821 which initializes a flag F to 0. Exit then is to decision step 822 to check to see if a position registration request is received from a mobile station or from a neighboring base station. If the request is not received, control returns to step 821, and if it is received from a mobile station, control branches to step 823 to set the flag to 1. Following step 823 or in response to a decision at step 822 indicating that a request is received from a neighboring base station, control branches to step 824 to store the received request into the position registration memory 72. When each of the base stations receives a call-setup signal from the paging station 8 (step 825), it examines the contents of the call-setup signal to determine whether it contains the same mobile user address code as that stored in the position registration memory 72 (step 826). If the answer is affirmative, control branches to step 827 to check to see if flag F is set to 1. If F=0, control recognizes that the position registration request has been received direct from the mobile station, it proceeds to step 828 to transmit a copy of the stored position registration request to neighboring base stations over channels 61, and 62, for example, and proceeds to step 829 to broadcast an alert signal. If the test at step 827 results in a negative decision, control recognizes that the request has been received from a neighboring station, it executes step 829. When an off-hook signal is returned from a mobile station within a specified period (step 830), the base station dials the received PSTN user address code (step 831) to the PSTN to cause it to establish a connection 15.

A third embodiment of the present invention is shown in FIG. 11 in which mobile's position registration is effected by the use of a central position registration memory 110 located in the paging station 8. Memory 110 is connected to a controller 111 through which position data is received and stored in memory 110. Controller 111 is also connected to transceiver 112 which broadcasts the call-setup signal to all base stations in response to receipt of a PSTN user address code and a mobile user address code from the PSTN via channel 9 in the same manner as described above. Controller 111 is further connected to the PSTN through a channel 113 to receive a position registration request from each of the base stations located within the service area of the paging station 8.

As shown in FIG. 12, a position registration is initiated by a request transmitted from a mobile station on entering a given base station zone. On receiving the registration request (step 121), each base station transmits a copy of this request to the paging station 8 by sending the access number of channel 9 to the PSTN (step 122). The position request transmitted from each base station contains the address code of the requesting mobile station and the ID code of the base station. Exit then is to the call completion process 81 (FIG. 8B).

In FIG. 13, the paging station monitors the channel 113 to check to see if a position registration request is received. If it is, control branches to step 132 to store the address code of the requesting mobile station and the ID code of the base station contained in the request into the memory 110. Following the execution of step 132 or negative decision of step 131, control enters a call receiving mode which begins with step 133 in which it checks to see if a PSTN user address code and a mobile user address code are received from the PSTN via channel 9. If the answer is affirmative, control branches at step 133 to step 134 to check to see if the received mobile user address code matches an address code stored in the position registration memory 110, control exits to step 135 to select a corresponding base station identifier code from the memory, and proceeds to step 136 to broadcast the selected base station ID code (or together with the base station ID codes of neighboring stations) and a copy of the received PSTN user and mobile user address codes, which is followed by the notification of an on-hook announcement to the PSTN user station (step 137).

If mobile station 10 sends a position registration request on entering service zone 5-2, the request is transmitted through channel 6-2 to the PSTN where a connection 134 is established between channels 6-1 and 113 and stored into the position registration memory 110. When PSTN user station 2 places a call to mobile station 10, a connection 115 is first established to the paging station from user station 2 via channel 9. Paging station 8 retrieves the ID code of the base station 4-2 from the memory 110 and broadcasts a call-setup signal containing the retrieved ID code and the received PSTN user and mobile user address codes. Thus, it is only the base station 4-2 that responds to the call-setup signal by broadcasting the address code of the mobile station 10 contained in the call-setup signal. On hearing the announcement, the user at station 2 replaces the handset, while the base station 4-2 dials the address code of the PSTN user station 2 to establish a connection 116 from PSTN station 2 to mobile station 10 through channel 6-2.

A fourth embodiment of this invention, shown in FIG. 14, relates to a local telephone network including a PBX (private branch exchange) 141 located in a customer premises 140 in which base stations 4'-1~4'-3 are provided to cover zones 5-1~5-3, respectively. Communication between the PSTN 1 and the PBX 141 proceeds through communication channels 148. A position registration memory 142 is provided for storing mobile's position data. A radio receiver 143 is connected to the PBX to establish a channel to the paging station 8. Receiver 143 is also adapted to receive a position registration signal from a mobile station 10a on entering the premises 140. An address memory 143 is provided to store PSTN user and mobile user address codes in response to an incoming call from the paging station 8.

In FIG. 15, when a position registration request is sent from mobile station 10a on entering the customer premises 140 from the outside, it is received by receiver 143, and sent to the PBX 141 (step 151). The PBX proceeds to establish a connection 145 and store the mobile user address code contained in the received request into position registration memory 142 (step 152). Following the execution of step 152 or negative decision of step 151, control enters a call receiving mode which begins with step 153 in which it checks to see if base station ID codes, a PSTN user address code and a mobile user address code are received from the receiver 143. If the answer is affirmative, control branches at step 153 to decision step 154 to check to see if the base-station address codes of the PBX match the received ID codes, and if the answer is affirmative, it branches to step 155 to check to see if the received mobile user address code matches an address code stored in the position registration memory 142. If the answer is again affirmative, control proceeds to step 156 to store both of the received address codes into the address memory 144. Step 157 is then executed by transmitting alert signals to all base stations 4'-1~4'-3.

Referring briefly to FIG. 16, if each base station receives an alert signal from the PBX 141 (step 161), it broadcasts a copy of the alert signal. If mobile station 10b is located in zone 5-2, an off-hook signal will be returned to the base station 4'-2 from that mobile station within a specified time (step 162), and the off-hook signal is relayed by the base station 4'-2 to the PBX (step 163).

Returning to FIG. 15, control proceeds to decision step 158 to check to see if an off-hook signal is received from a base station within a specified time. If the decision is affirmative, control branches to step 159 to read a PSTN user address code corresponding to the mobile station returning the off-hook signal and transmit it to the PSTN.

It will be seen that, when a call is placed from PSTN user station 2 to mobile station 10b located in zone 5-2 following the registration of the mobile's position, a connection 146 is established through the PSTN to the paging station 8 and the address codes of both calling and called parties are relayed by the paging station 8 to receiver 143. Meanwhile, the paging station 8 returns an announcement to urge the calling party to replace the handset, and clears the connection 146. The PBX, in response to the incoming call, sends alert signals on respective channels to all base stations 4'-1~4'-3. All base stations broadcast the alert signal to urge the mobile station 10b to answer the call. When user station 10b answers the call, base station 4'-2 transmits an off-hook signal to the PBX, which, in response, reads the PSTN user address code from memory 144 and establishes a connection 147 to channel 148 and transmit the PSTN user code to the PSTN to establish a connection 149 to the calling party. The embodiment of FIG. 14 is particularly useful for applications where mobile users are working or travelling in an underground space.

In the previous embodiments, the calling PSTN user must replace the handset if the common channel signalling network 17 is not provided in the PSTN. To eliminate the need for PSTN users to replace the handset, a connection unit 170 is provided as shown in FIG. 17. This connection unit includes a controller 171, a switching circuit 172 and a memory 173. Switching circuit 172 has inlet terminals connected to line terminals 174 and 175 of the PSTN and an outlet terminal connected to line 9. Controller 171 is also connected to the line terminals 174, 175 to receive calls from the PSTN. Switching circuit 172 is normally establishing a connection 179 between terminal 174 and line 9 to allow incoming calls from the PSTN to be directly passed to the paging station 8.

As illustrated in FIG. 18, the controller 171 is programmed to execute steps 181 through 184. Controller 171 constantly monitors the signals passing through the connection 179 and detects and stores PSTN user address codes and corresponding mobile user address codes arriving at line terminal 174 into the memory 173 (step 181). When a ringing connection is established through the paging station to a destination base station, completing steps 811 to 814 of FIG. 8B, the latter dials the address code of the line terminal 175 to access the connection unit 170 and transmits the calling PSTN user address code and the called mobile user address code as indicated by step 190 in FIG. 19. These code signals are received by the controller 171 (step 182), whereupon it makes a search through the memory 173 for corresponding address codes stored therein. If a coincidence is detected (step 183), controller 171 directs the switching circuit 172 to establish a connection 177 between line terminals 175 and 174 and clears the connection 179. Therefor, the call from PSTN user 2 to a mobile station either located in a base station 4 or in the PBX 141, a connection 176 is first established in the PSTN to the line terminal 174 and the PSTN user address code and the called party address code are transmitted through connection 179 and line 9 to the paging station 8. The destination base station or PBX will then dial the line terminal 175 to establish a connection 178 and return the same user address codes to the controller 171 to be checked with those stored in memory 173. The resultant coincidence causes connection 177 to be established and connection 179 to be cleared down, thus establishing a path from PSTN user station 2 through connections 176, 177 and 178 to a mobile station.

Depending on the amount of traffic to be carried through the paging station 8, the switching circuit 172 may comprise an array of cross-points as indicated in FIG. 17a to established multiple switched connections connected to corresponding line terminals of the PSTN. If the controller 171 sequentially establishes a path 177 in the multi-contact switch 172 and knows which path 179 is used to transmit a call-setup signal to the paging station 8, then the memory 173 could be dispensed with.

Figure 20:
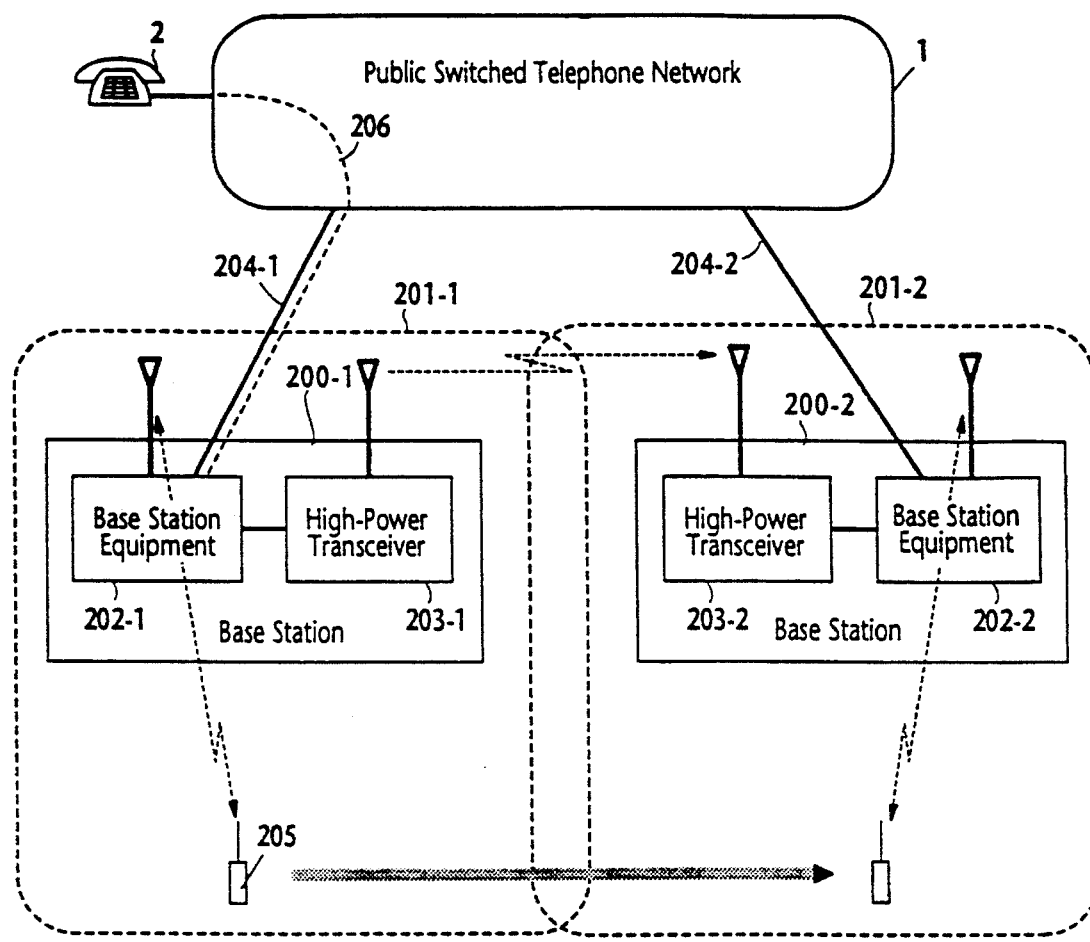
FIG. 20 is a schematic block diagram of a fifth embodiment of this invention.

There is often a need to move across the boundary of adjacent zones when a conversion is in progress. A simplified way of zone switching is shown in FIG. 20. In a typical example, the system includes two base stations 200-1 and 200-2 located in adjacent zones 201-1 and 202-2, respectively. Each base station includes a base station equipment 202 connected to the PSTN 1 through line 204 and a high-power radio transceiver 203 which receives signals from line 204 and establishes a channel with the high-power transceiver 203 of an adjacent base station. Note that the paging station 8 of the previous embodiments is not provided. Communication between a PSTN user station 2 and a mobile user station 205 in home zone 201-1 proceeds through a connection 206 established in the PSTN and through line 204-1 to base station equipment 202-1.

Figure 21:
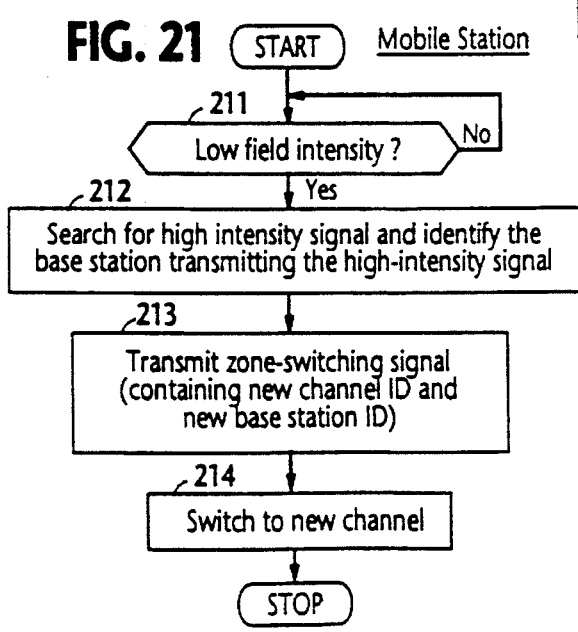
FIG. 21 is a flowchart of operations executed by a personal mobile station of FIG. 20.

Using a digital TDMA (time-division multiple access) technique, mobile station 205 is periodically monitoring the field intensity of the signal from the home base station at the site of the mobile station. As shown in FIG. 21, if the field intensity at the site of the mobile station 205 reduces below a certain threshold as it is moving in a direction toward the adjacent base station (step 211) during the conversion with the PSTN user 2, it searches through available speech channel identifiers indicated by a control channel and selects one of the channels having highest-intensity identification signals which indicate the channel numbers and the base station transmitting these signals (step 212). The mobile station 205 then transmits back to the home base station 200-1 a zone-switching signal (containing new channel ID and the ID of base station 200-2) through the control channel, indicating that it is now leaving the home zone and entering the base station 200-2 (step 213), and switches to the new channel (step 214).

Figure 22:
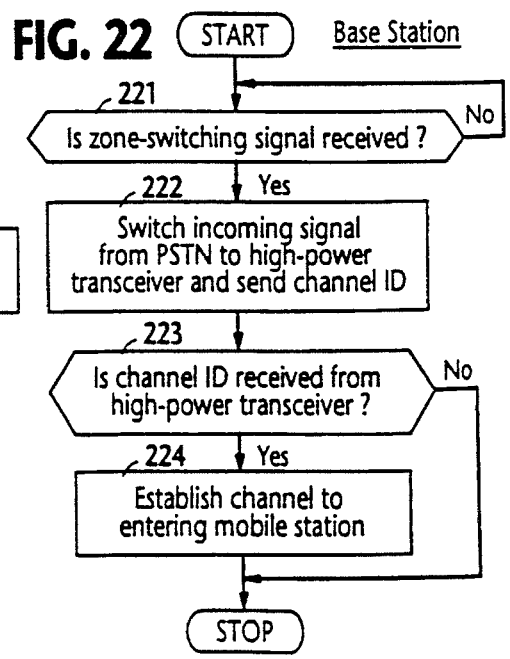
FIG. 22 is a flowchart of operations executed by the base stations of FIG. 20.

Meanwhile, each base station is constantly monitoring the control channel. When the zone-switching signal is detected by base station 200-1 (step 221, FIG. 22), it switches the signal from the PSTN to high-power transceiver 203-1, and sends the channel identifier received from the mobile station (step 222), the signal being transmitted to the high-power transceiver 203-2 where it is coupled to the base station equipment 202-2. Base station equipment 202-2, on detecting a signal from high-power transceiver 203-2 (step 223), establishes a channel identified by the received signal to the entering mobile station (step 224). In this way, connection is automatically reestablished through high-power transceivers 203-1 and 203-2.

I claim:

1. A personal mobile communications system for servicing a plurality of cells, comprising:

a mobile station for transmitting a position registration request containing a mobile user address code identifying the mobile station;

a plurality of base stations located respectively in said cells and connected to a public switched telephone network (PSTN), each base station including means for receiving the position registration request from said mobile station and transmitting a base registration request containing the mobile user address code of the position registration request and a base station identifier identifying the base station via a communication path; and a central station connected to said PSTN and including:
  memory;
  means for receiving the base registration request from each base station via said communication path, and storing the mobile user address code and the base station identifier of the base registration request into said memory; and
  means for receiving from said PSTN a first call-set-up signal containing a PSTN user address code and a mobile user address code, and in response, broadcasting a call-setup signal containing a said base station identifier stored in said memory, a said mobile user address code stored in said memory and the PSTN user address code of the call-setup signal from the PSTN in an area covering said plurality of said cells if there is a match between the mobile user address code of the call-setup signal from the PSTN and a mobile user address code stored in said memory, each of said base stations including means for receiving the broadcast call-setup signal which contains the identifier of the base station, and alerting a said mobile station and transmitting the PSTN user address code of the call-setup signal to the PSTN when the alerted mobile station returns a response signal.

2. A personal mobile communications systems as claimed in claim 1, wherein each of said base stations includes means for establishing said communication path through said PSTN.

3. A personal mobile communications system as claimed in claim 1, wherein said call-setup signal transmitted from the central station additionally contains the base station identifiers of said neighbors base stations in the neighborhood of said one base station.

4. A personal mobile communications system as claimed in claim 1 or 3, further comprising:

switching means for establishing a first connection between the PSTN and said central station for coupling the call-setup signal from the PSTN to the central station and establishing a second connection between one of said base stations and said PSTN user, instead of said first connection, for transmitting the PSTN user address code of said call-setup signal to the PSTN.

* * * * *

UNITED STATES PATENT AND TRADEMARK OFFICE
CERTIFICATE OF CORRECTION

PATENT NO. : 5,463,672
DATED : October 31, 1995
INVENTOR(S) : Kouzou Kage

It is certified that error appears in the above-indentified patent and that said Letters Patent is hereby corrected as shown below:

Col. 3, line 42, delete "5-1-5~5" and insert --5-1~5-5--.

Col. 5, line 64, after "station" insert --8--.

Col. 7, line 24, after "station" insert --, i.e. base registration request,--.

Col. 12, line 2, delete "neighbors" and insert --neighboring--.

Signed and Sealed this

Fourth Day of June, 1996

*Attest:*

BRUCE LEHMAN

*Attesting Officer*     *Commissioner of Patents and Trademarks*